United States Patent
Feng et al.

(10) Patent No.: US 11,553,031 B2
(45) Date of Patent: Jan. 10, 2023

(54) METHOD AND APPARATUS FOR PROCESSING DATA

(71) Applicant: HANGZHOU HIKVISION DIGITAL TECHNOLOGY CO., LTD., Hangzhou (CN)

(72) Inventors: Zhongjian Feng, Hangzhou (CN); Kui Li, Hangzhou (CN)

(73) Assignee: HANGZHOU HIKVISION DIGITAL TECHNOLOGY CO., LTD.

(*) Notice: Subject to any disclaimer, the term of this patent is extended or adjusted under 35 U.S.C. 154(b) by 0 days.

(21) Appl. No.: 17/311,629

(22) PCT Filed: Dec. 9, 2019

(86) PCT No.: PCT/CN2019/124072
§ 371 (c)(1),
(2) Date: Jun. 7, 2021

(87) PCT Pub. No.: WO2020/119646
PCT Pub. Date: Jun. 18, 2020

(65) Prior Publication Data
US 2022/0021725 A1    Jan. 20, 2022

(30) Foreign Application Priority Data

Dec. 11, 2018    (CN) .......................... 201811510277.3

(51) Int. Cl.
*H04L 29/08*    (2006.01)
*H04L 29/06*    (2006.01)
(Continued)

(52) U.S. Cl.
CPC ............ *H04L 67/02* (2013.01); *H04L 67/141* (2013.01); *H04L 67/5682* (2022.05); *H04L 69/162* (2013.01)

(58) Field of Classification Search
CPC ................... H04L 67/02; H04L 67/141; H04L 67/2852; H04L 67/1097; H04L 67/2842; H04L 69/162
(Continued)

(56) References Cited

U.S. PATENT DOCUMENTS

| 8,994,967 B1 | 3/2015 | Mayers et al. |
| 9,350,763 B1 | 5/2016 | McHugh et al. |
| 9,641,566 B1* | 5/2017 | Hiremath ........... H04N 21/4334 |

(Continued)

FOREIGN PATENT DOCUMENTS

| CN | 103248701 A | 8/2013 |
| CN | 104852935 A | 8/2015 |

(Continued)

OTHER PUBLICATIONS

Malte Ubl and Eiji Kitamura, "Introducing WebSockets: Bringing Sockets to the Web", Oct. 2010, html5rocks.com, https://www.html5rocks.com/en/tutorials/websockets/basics/ (Year: 2010).*

(Continued)

*Primary Examiner* — Ruolei Zong
(74) *Attorney, Agent, or Firm* — Fish & Richardson P.C.

(57) ABSTRACT

The present disclosure provides a method and an apparatus for processing data. The method includes: establishing a data connection between a local service and a Web client, receiving data that the Web client transmits to the local service through the data connection; and storing the received data to the designated local storage space.

14 Claims, 4 Drawing Sheets

(51) Int. Cl.
*H04L 67/02* (2022.01)
*H04L 67/141* (2022.01)
*H04L 69/16* (2022.01)
*H04L 67/5682* (2022.01)

(58) Field of Classification Search
USPC .......................................................... 709/224
See application file for complete search history.

(56) References Cited

U.S. PATENT DOCUMENTS

| | | | |
|---|---|---|---|
| 2010/0030871 A1* | 2/2010 | Jolly | G06F 16/00 709/219 |
| 2010/0235321 A1* | 9/2010 | Shukla | H04L 67/10 707/610 |
| 2010/0235830 A1* | 9/2010 | Shukla | G06F 9/44526 718/1 |
| 2012/0254759 A1* | 10/2012 | Greenberg | G06F 16/958 715/719 |
| 2013/0346535 A1* | 12/2013 | Burckart | H04L 29/08549 709/213 |
| 2014/0122866 A1* | 5/2014 | Haeger | H04L 63/0471 713/153 |
| 2015/0249709 A1 | 9/2015 | Teng et al. | |
| 2015/0358328 A1 | 12/2015 | Kaplan et al. | |
| 2016/0225408 A1* | 8/2016 | Khan | G11B 27/34 |
| 2016/0255088 A1 | 9/2016 | Kaplan et al. | |
| 2017/0193221 A1* | 7/2017 | Liu | H04L 63/10 |
| 2017/0344484 A1* | 11/2017 | Pack, III | G06F 12/0833 |
| 2018/0174612 A1* | 6/2018 | Schulz | G06T 1/60 |
| 2019/0245903 A1* | 8/2019 | Wallenstein | H04L 65/607 |

FOREIGN PATENT DOCUMENTS

| | | |
|---|---|---|
| CN | 107959727 A | 4/2018 |
| CN | 108170745 A | 6/2018 |

OTHER PUBLICATIONS

Bryan Jennings, "How to record and play audio in JavaScript", Oct. 2017, medium.com, https://medium.com/@bryanjenningz/how-to-record-and-play-audio-in-javascript-faa1b2b3e49b (Year: 2017).*

Eric Bidelman, "Capturing Audio & Video in HTML5", Oct. 2016, html5rocks.com, https://web.archive.org/web/20171215154030/https://www.html5rocks.com/en/tutorials/getusermedia/intro/ (Year: 2016).*

CN Office Action and Search Report issued in Chinese Appln. No. 2018115102773, dated Jan. 6, 2021, 10 pages (With English Translation).

PCT International Search Report in International Appln. No. PCT/CN2019/124072, dated Mar. 9, 2020, 4 pages (With English Translation).

CN Office Action and Search Report issued in Chinese Appln. No. 201811510277.3, dated Nov. 23, 2021, 12 pages (With English Translation).

Extended European Search Report issued in European Appln. No. 19895586.6, dated Dec. 1, 2021, 6 pages.

PCT International Written Opinion in International Appln. No. PCT/CN2019/124072, dated Mar. 9, 2020, 8 pages (With English Translation).

* cited by examiner

METHOD AND APPARATUS FOR PROCESSING DATA

CROSS REFERENCE TO RELATED APPLICATIONS

The present application is a U.S. National Phase of International Application No. PCT/CN2019/124072, entitled "DATA PROCESSING METHOD AND APPARATUS", and filed on Dec. 9, 2019. International Application No. PCT/CN2019/124072 claims priority to Chinese Patent Application No. 201811510277.3 entitled "DATA PROCESSING METHOD AND DEVICE" filed on Dec. 11, 2018. The entire contents of each of the above-listed applications are hereby incorporated by reference for all purposes.

TECHNICAL FIELD

The present disclosure relates to the field of front-end Web technology, in particular to a method and an apparatus for processing data.

BACKGROUND

At present, due to the fact that some browsers do not support virtual file systems, the browsers cannot write data to the local Personal Computer (PC), but can only store the received data in the memory. When the amount of data is relatively large, the data will occupy a large amount of PC memory space, and even cause the PC to fail to operate properly.

SUMMARY

In view of the above, the present disclosure provides a method and an apparatus for processing data.

Specifically, the present disclosure is implemented through the following technical solutions.

According to a first aspect of the examples of the present disclosure, a method for processing data is provided, including:
  establishing a data connection between a local service and a Web client;
  receiving data that the Web client transmits to the local service through the data connection; and
  storing the data in a designated local storage space.

According to a second aspect of the examples of the present disclosure, an apparatus for processing data is provided, including:
  a connection establishing unit configured to establish a data connection between a local service and a Web client;
  a receiving unit configured to receive data that the Web client transmits to the local service through the data connection; and
  a processing unit configured to store the data in a designated local storage space.

According to a third aspect of the examples of the present disclosure, an electronic device is provided, including a processor, a communication interface, a storage medium, and a communication bus. The processor, the communication interface, and the storage medium communicate with one another through the communication bus;
  storage medium configured to store machine executable instructions;
  the processor is configured to implement the method for processing data when executing machine executable instructions stored on the storage medium.

According to a fourth aspect of the examples of the present application, there is provided a machine-readable storage medium, the machine-readable storage medium stores machine-executable instructions, and the machine-executable instructions are executed by a processor to implement the method for processing data.

In the method for processing data of the examples of the present disclosure, a data connection between a local service and a Web client is established, and data that the Web client transmits to the local service is received through the data connection, and further, the received data is stored in the designated local storage space. In the case where the browser does not support storing the data locally on the PC, the data of the Web client can be stored locally on the PC, avoiding the browser data from occupying a large amount of PC memory, and improving the reliability and stability of the system.

DETAILED DESCRIPTION OF THE EMBODIMENTS

Figure 1:
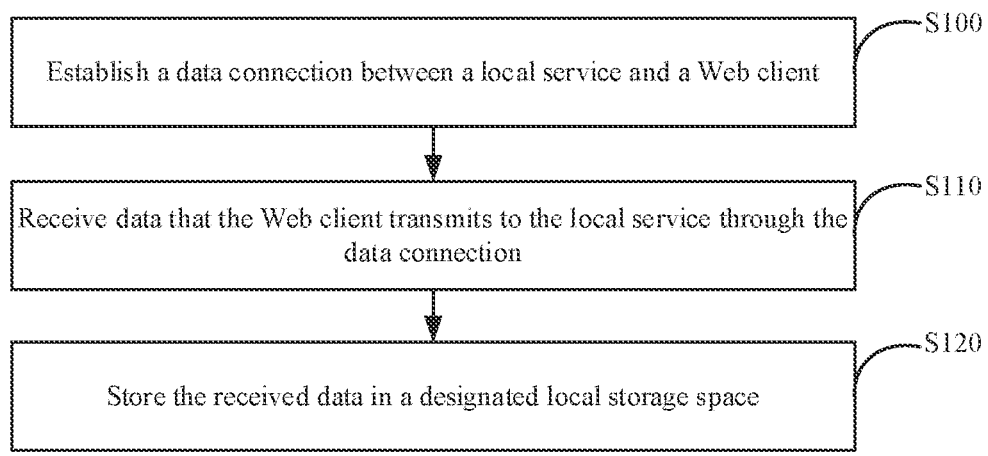
FIG. 1 is a flowchart of a method for processing data according to an example of the present disclosure.

Examples will be described in detail herein, with the illustrations thereof represented in the drawings. When the following descriptions involve the drawings, like numerals in different drawings refer to like or similar elements unless otherwise indicated. The examples described in the following examples do not represent all examples consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context.

In order to enable those skilled in the art to better understand the technical solutions according to the examples of the present disclosure, the technical solutions in the examples of the present disclosure will be described in further detail below in conjunction with the accompanying drawings.

Referring to FIG. 1, which is a flowchart of a method for processing data according to an example of the present disclosure, as shown in FIG. 1, the method for processing data can include the following steps.

It should be noted that the method for processing data shown in FIG. 1 can be applied to an electronic device that supports browser installation and data storage, such as a PC (PC is taken as an example below).

At Step S100, a data connection between a local service and a Web client is established.

In the examples of the present disclosure, a Web page displayed by the Web client (that is, a web page accessed through a browser) can be used to represent the Web client.

In the examples of the present disclosure, considering that some browsers cannot store data locally on the PC, but can only store data in the memory of the PC, when the amount of data is large, it will occupy a large amount of the memory of the PC. Therefore, in order to enable the browser to store data in the local storage space of the PC (such as a disk), and a service (hereinafter referred to as local service) can be started in the PC for storing the data received by the browser (such as the data received from the Web server) to the local storage space of the PC. The local service can be a background application in a form of a process that runs in the background which is configured to store the data received by the browser in the local storage space of the PC.

Here, the local service and the Web client run independently of each other, and the local service does not rely on the Web client (or browser) to run.

Correspondingly, in this example of the present disclosure, the local service can establish a data connection with the Web client.

Here, the data connection can include, but is not limited to, a Websocket connection or an HTTP (Hypertext Transfer Protocol, hypertext transfer protocol) connection, etc.

For example, when the Web client is started and it is determined that it needs to obtain data from the server, the Web client can detect whether the local service has been started, and when the local service has been started, the Web client can initiate a connection establishment request to the local service. When the local service receives the connection establishment request, the local service can establish a data connection with the Web client.

Here, the specific process of data connection between the local service and the Web client is not described here.

At Step S110, data that the Web client transmits to the local service through the data connection is received.

In this example of the present disclosure, after the Web client establishes a data connection with the local service, the Web client can send the received data (such as data sent by the Web server) to the local service through the data connection.

Correspondingly, the local service can receive the data transmitted by the Web client through the data connection.

At Step S120: the received data is stored in a designated local storage space.

In this example of the present disclosure, the local service can store the data received through the data connection (with the Web client) in the designated local storage space.

Here, the designated local storage space can be a designated file directory in the local file system of the PC.

For example, when a local service establishes a data connection with a Web client, a file directory for storing the data of the Web client can be created in the local file system of the PC.

When the local service receives the data sent by the web client through the data connection, the local service can store the received data in the file directory.

It can be seen that in the method flow shown in FIG. 1, by starting a local service in the PC for storing the data of the Web client to the PC, in the case where the browser does not support storing the data to the PC, the data of the Web client can be stored locally on the PC, which can prevent the data of the browser from occupying the memory of the PC and improve the reliability and stability of the system.

Further, in the examples of the present disclosure, considering that a plurality of web clients can be running on the same PC (for example, a plurality of web pages opened on the same PC in the same browser, or a plurality of web pages opened in different browsers), In order to ensure the accuracy of data reading and writing for the Web clients, it is necessary to store data from different Web clients in a distinguishable manner.

Correspondingly, in one of the examples of the present disclosure, after the data connection between the local service and the Web client is established, the method can further include:

generating a target identifier, the target identifier is used to uniquely identify the data connection;

storing data in the designated local storage space can include:

storing the data in the designated local storage space corresponding to the target identifier.

In this example, after the local service establishes a data connection with the Web client, a data connection identifier (referred to as a target identifier herein) for uniquely identifying the data connection can be generated.

Correspondingly, the local service can allocate local storage space (that is, the above-mentioned designated local storage space) to the Web client associated with the target identifier; when the local service receives the data sent by the Web client through the data connection, the local service can store the received data in the designated local storage space corresponding to the target identifier.

Further, in the examples of the present disclosure, after the Web client receives certain specific data, the Web client usually needs to perform certain processing before storing the data, for example, transcoding the video data, etc. In order to avoid the problem of insufficient data processing capability of the Web client, the local service can process and store the data for the Web client.

Correspondingly, in one of the examples of the present disclosure, before storing the data in the designated local storage space, the method can further include:

processing the data according to a preset policy;

storing data in the designated local storage space includes:

storing the processed data in the designated local storage space.

In this example, when the local service receives the data transmitted by the Web client through the data connection, the local service can process the data according to a preset policy.

For example, for video data, the received video data can be converted into a specified format; or, for picture data, a picture of a size exceeding a preset threshold can be divided into multiple pictures of a specified size, etc.

In this example, after the local service processes the received data from the Web client according to a preset policy, the processed data can be stored in the designated local storage space.

It should be noted that in this example of the present disclosure, after establishing a data connection to the local service, the Web client can also send a data processing instruction to the local service, and the data processing instruction can include a data processing policy.

Correspondingly, after establishing a data connection with the Web client, the local service can also receive a data processing instruction sent by the Web client through the data connection, and before storing the data sent by the Web client through the data connection to the designated local storage space, the local service can process the data according to the data processing policy included in the data processing instruction, and then store the processed data in the designated local storage space.

Further, in this example of the present disclosure, the local service can use different storage methods for storing the data of the Web client according to actual needs, which can include temporary storage or long-term storage.

Here, in the temporary storage mode, the local service can be equivalent to a virtual file system, storing the data sent by the Web client through the data connection, and returning the stored data to the Web client when the data writing is completed, and delete the data stored in the designated local storage space; wherein the designated local storage space used to temporarily store the data sent by the Web client through the data connection can be referred to as a first designated local storage space.

In the long-term storage mode, the local service can store the data sent by the web client through the data connection in the designated local storage space for a long term, and return the storage path of the data to the web client for subsequent data access. Here, the designated local storage space used for long-term storage of data sent by the Web client through the data connection can be referred to as a second designated local storage space.

Correspondingly, in one of the examples of the present disclosure, after storing the data in the designated local storage space, the method further includes:
  when the data storage is completed, sending the data stored in the first designated local storage space to the Web client, and deleting the data stored in the first designated local storage space.

In this example, when the local service completes the data storage of the Web client, the local service can send the data stored in the first designated local storage space to the Web client, and delete the data stored in the first designated local storage space.

Here, when the Web client transmits data to the local service through the data connection, the Web client can send a data stop writing instruction to the local service when the data transmission is completed to notify the local service that the data transmission has been completed, and the local service can determine that the data storage is completed when the data of the Web client received through the data connection (that is, the data received before the data stop writing instruction is received) are stored in the first designated local storage space.

In this example, when the Web client receives the data returned by the local service, the Web client can prompt the user to download the data and store the data in the designated storage space (including local storage space or peripheral devices, such as a U disk, a mobile hard disk or the like), specific implementation will not be given to avoid limitation.

In another example of the present disclosure, after storing the data in the designated local storage space, the method further includes:
  when the data storage is completed, sending the storage path corresponding to the second designated local storage space to the Web client.

In this example, when the local service completes the data storage for the Web client, the local service can send the storage path corresponding to the second designated local storage space to the Web client.

In an example, in a subsequent data access process, the Web client can send an access instruction for the storage path to the local service, and the local service responds to the access instruction to access the storage path and perform data access under the storage path (that is, the data access of the second designated local storage space).

In another example, in the subsequent data access process, the user can also directly access the data stored in the storage path on the PC according to the storage path.

It should be noted that, in this example of the present disclosure, the data stored by the local service in the first designated local storage space or/and the second designated local storage space can be unprocessed data or data processed in accordance with the method described in the above example. Specific implementation will not be given to avoid limitation.

In addition, in order to increase the controllability of data storage, after the Web client establishes a data connection with the local service, the Web client can also send a data processing instruction including a data storage policy to the local service.

Correspondingly, after the local service receives the data sent by the Web client through the data connection, the local service can also store the data (which can be processed data or unprocessed data) according to the data storage policy included in the received data processing instruction, such as storing in the first designated local storage space (that is, temporary storage) or/and storing in the second designated local storage space (that is, long-term storage).

In order to enable those skilled in the art to better understand the technical solutions provided by the examples of the present disclosure, the technical solutions provided by the examples of the present disclosure will be described below with reference to specific examples.

Figure 2:
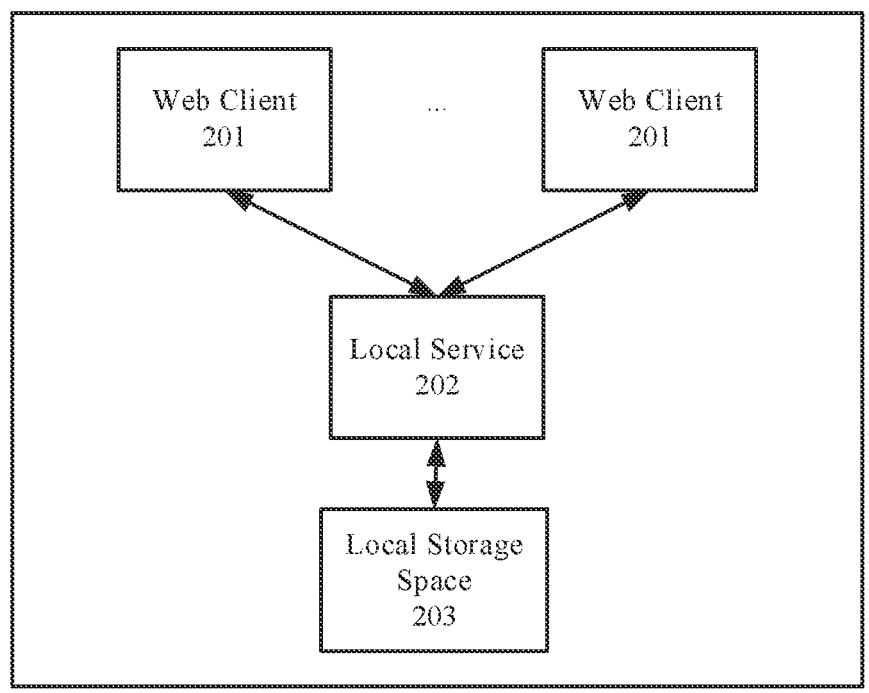
FIG. 2 is a schematic diagram of an application scenario according to an example of the present disclosure.

Referring to FIG. 2, which is a schematic diagram of an application scenario according to an example of the present disclosure. As shown in FIG. 2, in the present disclosure scenario, a PC is installed with a local service 202 (taking the Websocket service as an example) for storing data received by the Web client 201 in the local storage space 203 of the PC, the local service is a background application in a form of a process that runs in the background.

Figure 3:
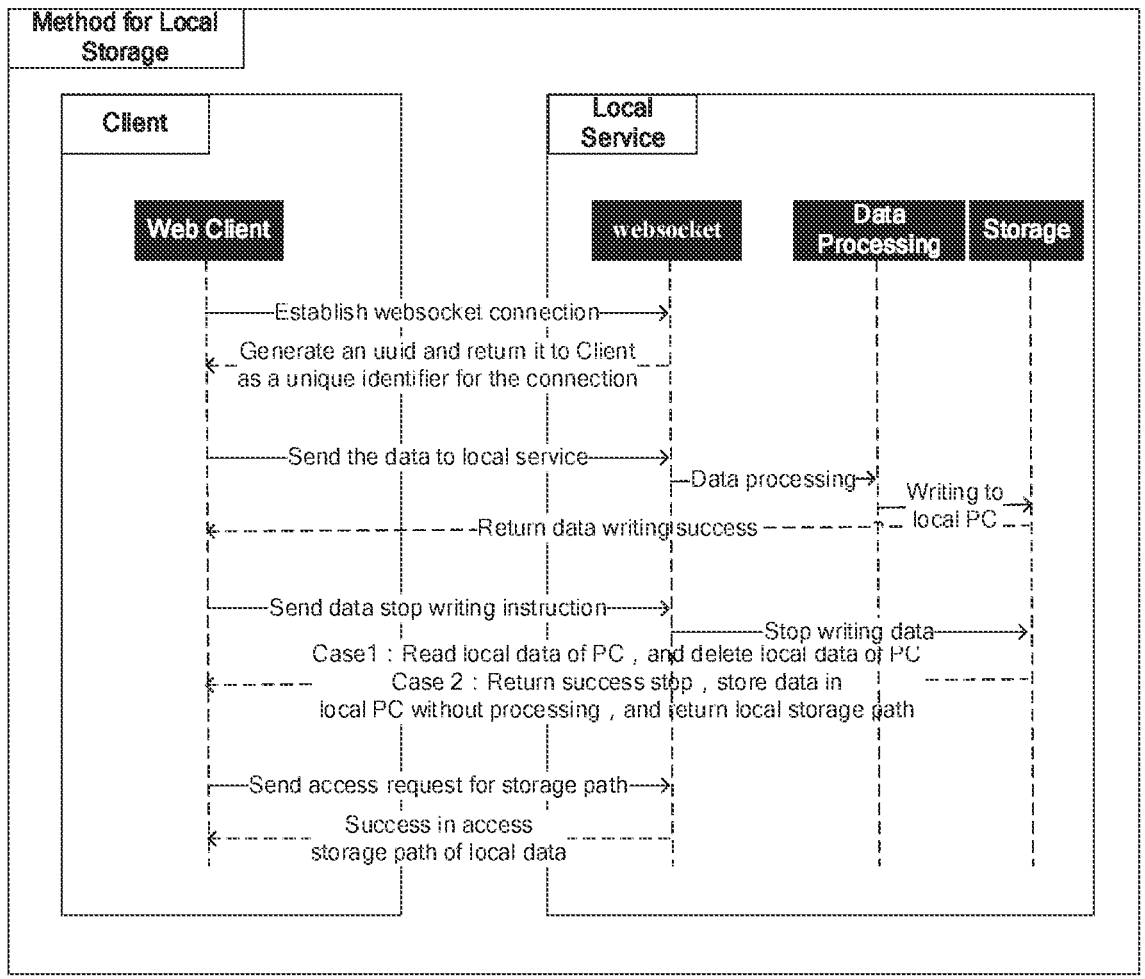
FIG. 3 is a flowchart of a method for processing data according to an example of the present disclosure.

Referring to FIG. 3, in this example, when the Web client is started and determines that the Web client needs to obtain data from the server, the Web client can detect whether the local service has been started, and when the local service has been started, the Web client can initiate a connection establishment request to the local service.

When the local service receives the connection establishment request, the local service can establish a data connection with the Web client, generate a UUID (Universally Unique Identifier) used to uniquely identify the Websocket connection, and allocate designated local storage space corresponding to the UUID to the Web client.

In this example, a Web client that provides a video recording function is taken as an example.

When the web client receives a video code stream, the web client can transmit the received video code stream to the local service through the Websocket connection.

When the local service receives the video stream transmitted by the Web client through the Websocket connection, the local service can transcode the received video stream and convert it into a specified format, such as Moving Picture Experts Group 4 (MP4) format and store the converted video stream to the designated local storage space to form a video file.

Here, after the local service successfully stores the processed video stream to the designated local storage space, the local service can return a data writing success notification message to the Web client, so that the Web client can confirm the successful completion of the data writing.

In this example, when the Web client determines that the video stream that needs to form a video file is written successfully, the Web client can send a data stop writing instruction to the local service through the Websocket connection to notify the local service that the data writing is completed. When the local service receives the instruction to stop writing the data, the local service no longer stores the data received through the Websocket connection in the designated local storage space.

In this example, after the Web client establishes a Websocket connection with the local service, before data transmission, the Web client can send a data processing instruction including a data storage policy to the local service, where the data storage policy is for temporary storage or long-term storage, so that the local service can perform temporary storage or long-term storage on the data transmitted through the Websocket connection.

Here, when the data storage policy included in the data processing instruction received by the local service is a data storage policy used to indicate that data is temporarily stored, the local service can return the data in the first designated local storage space to the Web client when the local service receives the instruction to stop writing data, and delete the data stored in the first designated local storage space.

When the data storage policy included in the data processing instruction received by the local service is a data storage policy used to indicate that data is stored for a long term, the local service can return to the storage path corresponding to the second designated local storage space to the Web client when receiving the instruction to stop writing data.

When the local service receives an access request for the storage path, the local service can respond to the access request to access the storage path.

In this example of the present disclosure, by establishing a data connection with the Web client, and receiving the data transmitted by the Web client through the data connection, and then storing the received data in the designated local storage space. When the browser does not support storing the data locally on the PC, it can enable storing the data of the Web client on the PC, which can prevent the data of the browser from occupying the memory of the PC and improve the reliability and stability of the system.

The method provided in the present disclosure has been described above. In the following an apparatus provided by the present disclosure will be described.

Figure 4:
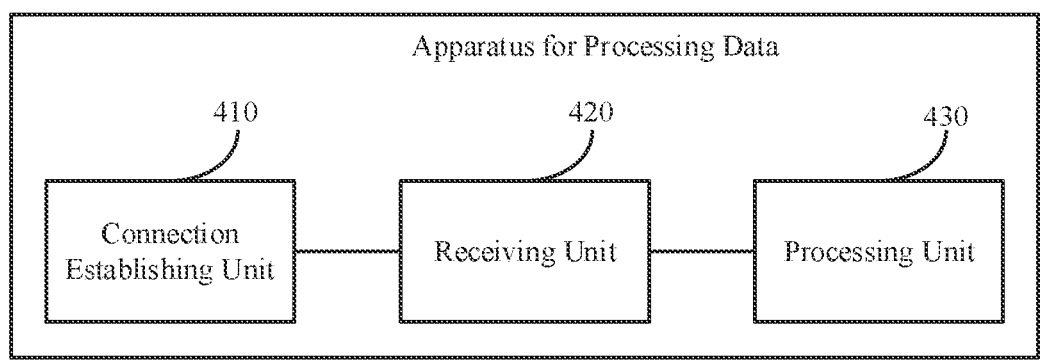
FIG. 4 is a block diagram of an apparatus for processing data according to an example of the present disclosure.

Referring to FIG. 4, which is a block diagram of an apparatus for processing data according to an example of the present disclosure. The apparatus for processing data can be applied to the PC in the above method embodiment. As shown in FIG. 4, the apparatus can include:

a connection establishing unit 410 configured to establish a data connection between a local service and a Web client;

a receiving unit 420 configured to receive data that the Web client transmits to the local service through the data connection;

a processing unit 430 configured to store the data in a designated local storage space.

In an optional implementation, the connection establishing unit 410 is specifically configured to establish a Websocket connection between the local service and the Web client; or, establish a hypertext Transmission protocol HTTP connection between the local service and the Web client.

Figure 5:
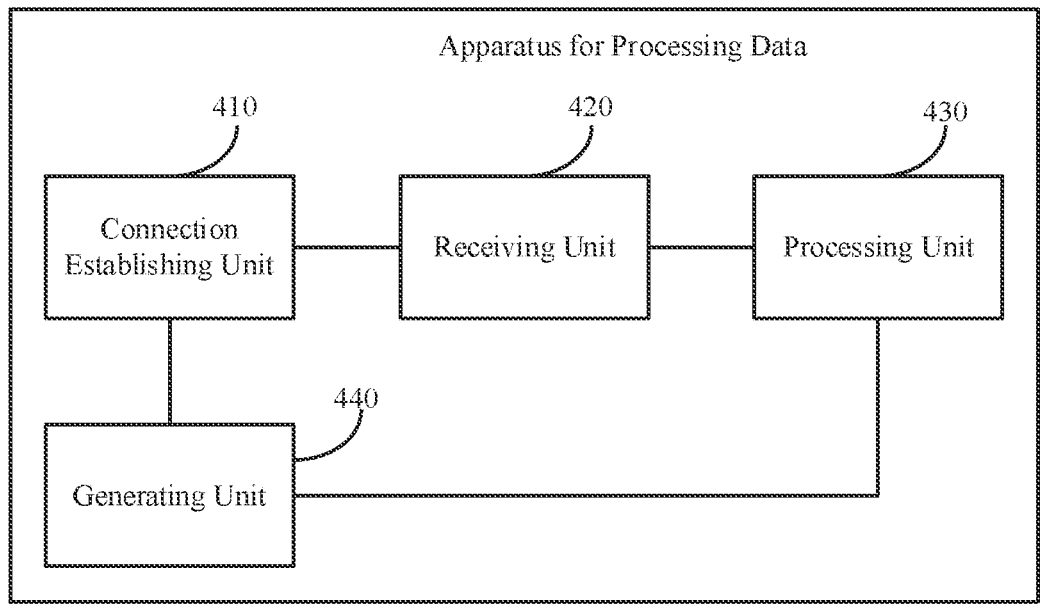
FIG. 5 is a block diagram of an apparatus for processing data according to another example of the present disclosure.

In an optional implementation, as shown in FIG. 5, the apparatus further includes:

a generating unit 440 configured to generate a target identifier, where the target identifier is used to uniquely identify the data connection;

the processing unit 430 is specifically configured to store the data in a designated local storage space corresponding to the target identifier.

In an optional implementation, the processing unit 430 is further configured to process the data according to a preset policy;

the processing unit 430 is also specifically configured to store the processed data in the designated local storage space.

Figure 6:
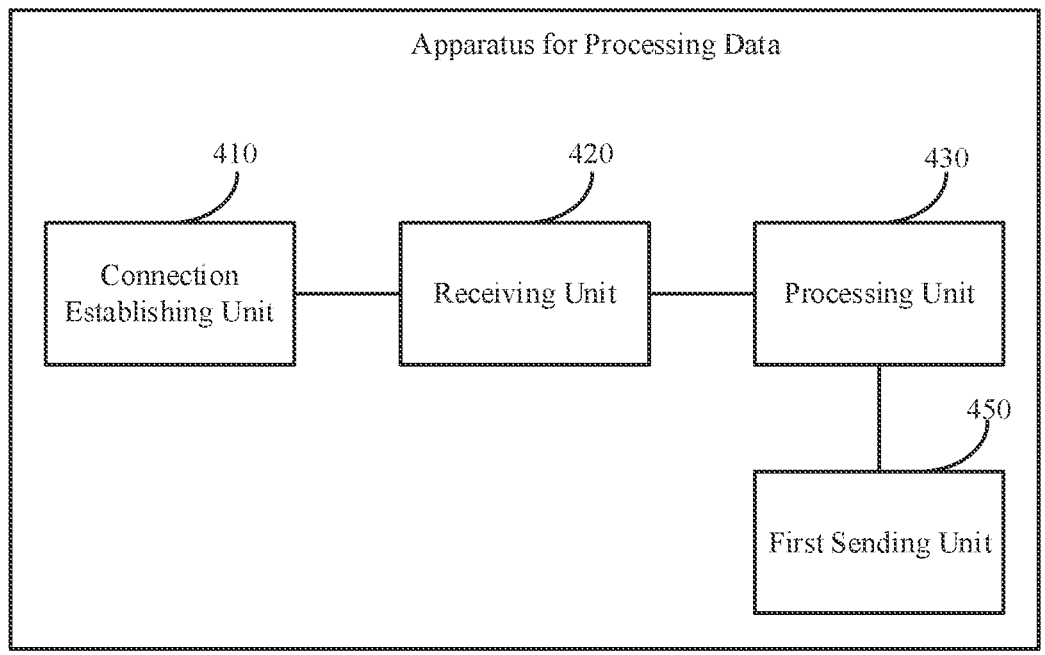
FIG. 6 is a block diagram of an apparatus for processing data according to another example of the present disclosure.

In an optional implementation, as shown in FIG. 6, the apparatus further includes:

a first sending unit 450 configured to send the data stored in the first designated local storage space to the Web client when the data storage is completed;

the processing unit 430 is further configured to delete data stored in the first designated local storage space.

Figure 7:
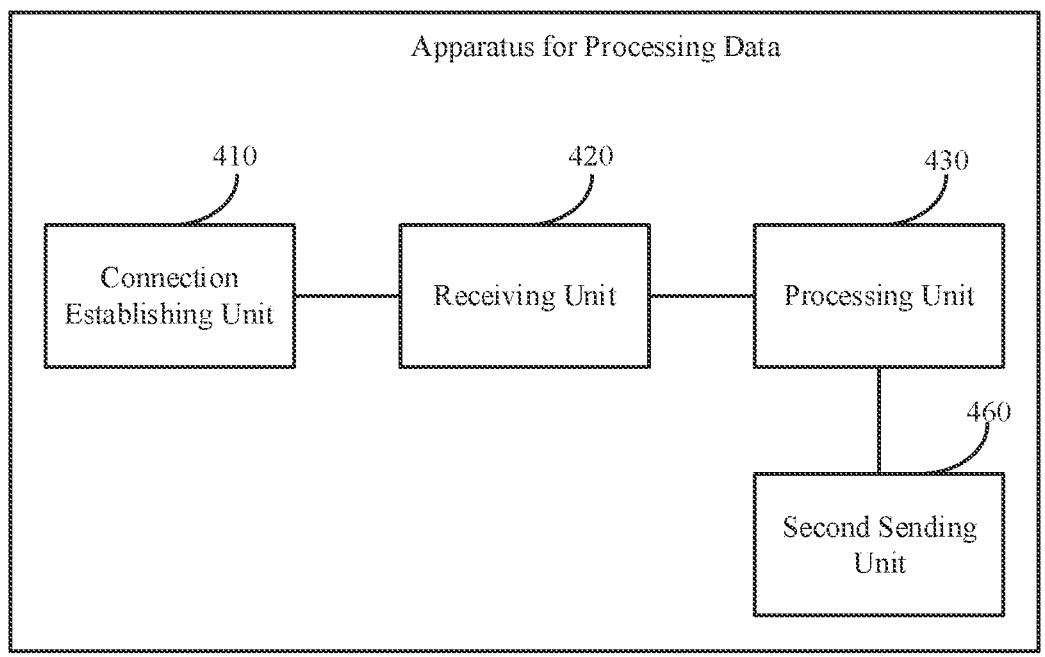
FIG. 7 is a block diagram of an apparatus for processing data according to another example of the present disclosure.

In an optional implementation, as shown in FIG. 7, the apparatus further includes:

a second sending unit 460 configured to send the storage path corresponding to the second designated local storage space to the Web client when the data storage is completed.

It should be noted that, in practical applications, the first sending unit 450 and the second sending unit 460 can be implemented by the same sending unit, and the specific implementation is not elaborated herein.

In an optional implementation, the receiving unit 420 is further configured to receive an access instruction for the storage path sent by the Web client;

the processing unit 430 is further configured to access the storage path in response to the access instruction.

In an optional implementation, the receiving unit 420 is further configured to receive a data processing instruction sent by the Web client through the data connection, and the data processing instruction includes: a data processing policy or/and a data storage policy:

the processing unit 430 is further configured to process the data according to the data processing policy;

or/and, the processing unit 430 is specifically configured to store the data in the first designated local storage space or/and the second designated local storage space according to the data storage policy.

Figure 8:
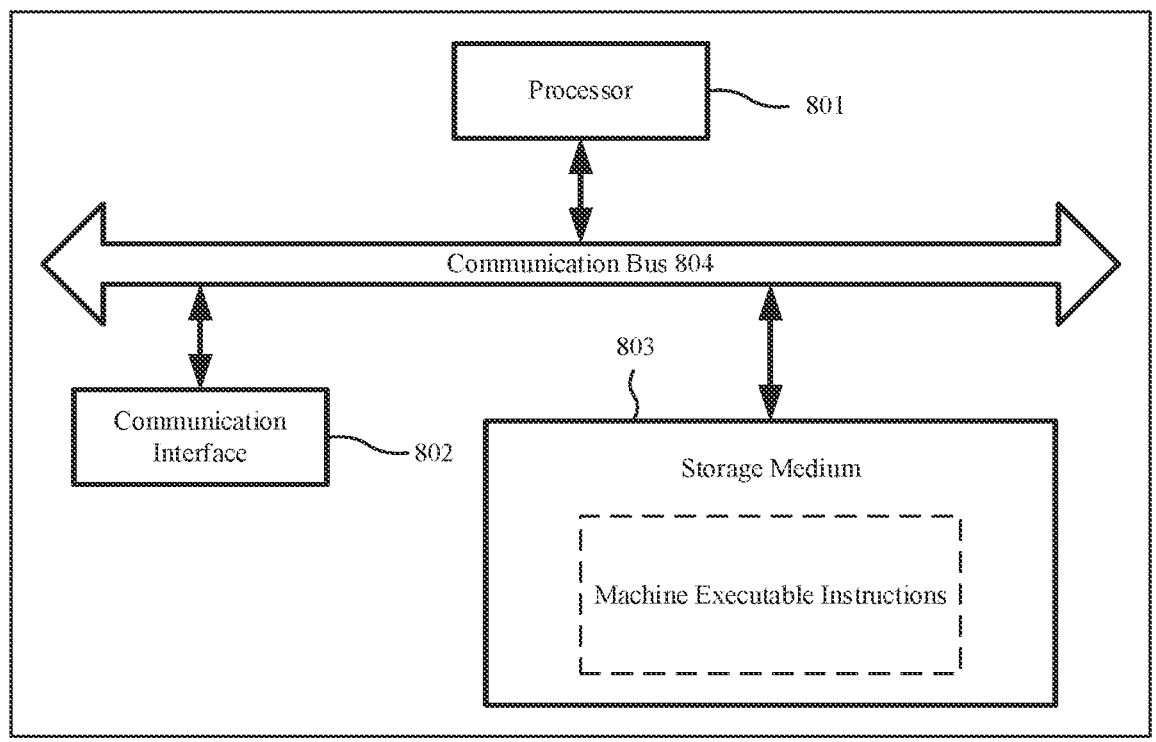
FIG. 8 is a block diagram of a hardware structure of an electronic device according to an example of the present disclosure.

Referring to FIG. 8, which is a schematic diagram of the hardware structure of an electronic device according to an example of the present disclosure. The electronic device can include a processor 801, a communication interface 802, a storage medium 803, and a communication bus 804. The processor 801, the communication interface 802, and the storage medium 803 communicate with one another through the communication bus 804. Here, the storage medium 803 stores machine executable instructions; the processor 801 can execute the method for processing data by executing the machine executable instructions stored on the storage medium 803.

The storage medium 803 can be any electronic, magnetic, optical or other physical storage device, which can contain or store information, such as executable instructions, data, and so on. For example, the storage medium 802 can be, a RAM (Radom Access Memory, random access memory), a volatile memory, a non-volatile memory, a flash memory, a storage drive (such as a hard drive), a solid state drive, and any type of storage disk (such as CD, DVD, etc.), or similar storage media, or a combination of them.

The example of the present disclosure also provides a machine-readable storage medium storing machine-executable instructions, such as the storage medium 803 in FIG. 8. The machine-executable instructions can be processed by the electronic device shown in FIG. 8, to implement the method for processing data described above.

It should be noted that as used herein, relational terms such as first and second are only used to distinguish one entity or operation from another entity or operation, and do not necessarily require or imply there is any such actual relationship or sequence between these entities or operations. Moreover, the terms "include", "comprise" or any other variants thereof are intended to cover non-exclusive inclusion, so that a process, method, article or device including a series of elements not only includes those elements, but also includes other elements that are not explicitly listed of, or also include elements inherent to this process, method, article or device. Unless otherwise restricted, the element defined by the sentence "including a . . . " does not exclude the existence of other identical elements in the process, method, article, or device that includes the element.

The above descriptions are only preferred examples of the present disclosure, and are not intended to limit the present disclosure. Any modification, equivalent replacement, improvement, or the like made within the spirit and principle of the present disclosure shall fall within the scope of protection of the present disclosure.

What is claimed is:

1. A method of processing data, comprising:
    establishing a data connection between a local service and a Web client, wherein the local service and the Web client are installed in a same electronic device, and the local service is an application which runs independently from the Web client;
    after establishing the data connection between the local service and the Web client, generating a target identifier that is configured to uniquely identify the data connection;
    receiving a data processing instruction including a data storage policy sent from the Web client to the local service through the data connection, wherein the data storage policy specifies one of a temporary storage of data or a long-term storage of data;
    receiving data that the Web client transmits to the local service through the data connection; and
    storing, through the local service, the data in a designated local storage space of the electronic device based on the data storage policy, the designated local storage space corresponding to the target identifier.

2. The method of claim 1, wherein establishing the data connection between the local service and the Web client comprises:
    establishing a Websocket connection between the local service and the Web client; or
    establishing a Hypertext Transfer Protocol HTTP connection between the local service and the Web client.

3. The method of claim 1, wherein the data processing instruction further comprises a data processing policy, and wherein the method further comprises: before storing the data in the designated local storage space,
    processing the data according to the data processing policy; and
    wherein storing the data in the designated local storage space based on the data storage policy comprises:
    storing the processed data in the designated local storage space based on the data storage policy.

4. The method of claim 1, wherein the data storage policy specifies the temporary storage of data, and the designated local storage space is a first designated local storage space for the temporary storage, and
    wherein the method further comprises:
    in response to determining that storing the data is completed, sending the data stored in the first designated local storage space to the Web client, and deleting the data stored in the first designated local storage space.

5. The method of claim 1, wherein the data storage policy specifies the long-term storage of data, and the designated local storage space is a second designated local storage space for the long-term storage, and
    wherein the method further comprises:
    in response to determining that storing the data is completed, sending a storage path corresponding to the second designated local storage space to the Web client.

6. The method of claim 5, wherein after sending the storage path corresponding to the second designated local storage space to the Web client, the method further comprises:
    receiving an access instruction for the storage path sent by the Web client; and
    accessing the storage path in response to the access instruction.

7. An electronic device, comprising:
    at least one processor; and
    at least one memory coupled to the at least one processor and storing machine executable instructions for execution by the at least one processor to perform operations comprising:
    establishing a data connection between a local service and a Web client, wherein the local service and the Web client are installed in the electronic device, and the local service is an application which runs independently from the Web client;
    after establishing the data connection between the local service and the Web client, generating a target identifier that is configured to uniquely identify the data connection;
    receiving a data processing instruction including a data storage policy sent from the Web client to the local service through the data connection, wherein the data storage policy specifies one of a temporary storage of data or a long-term storage of data;
    receiving data that the Web client transmits to the local service through the data connection; and
    storing, through the local service, the data in a designated local storage space of the electronic device based on the data storage policy, the designated local storage space corresponding to the target identifier.

8. The electronic device of claim 7, wherein establishing the data connection between the local service and the Web client comprises:
   establishing a Websocket connection between the local service and the Web client; or
   establishing a Hypertext Transfer Protocol HTTP connection between the local service and the Web client.

9. The electronic device of claim 7, wherein the data processing instruction further comprises a data processing policy, and
   wherein the operations further comprise:
      before storing the data in the designated local storage space based on the data storage policy, processing the data according to the data processing policy, and
   wherein storing the data in the designated local storage space based on the data storage policy comprises:
      storing the processed data in the designated local storage space based on the data storage policy.

10. The electronic device of claim 7, wherein the data storage policy specifies the temporary storage of data, and the designated local storage space is a first designated local storage space for the temporary storage, and
   wherein the operations further comprise:
      in response to determining that storing the data is completed, sending the data stored in the first designated local storage space to the Web client, and deleting the data stored in the first designated local storage space.

11. The electronic device of claim 7, wherein the data storage policy specifies the long-term storage of data, and the designated local storage space is a second designated local storage space for the long-term storage, and
   wherein the operations further comprise:
      in response to determining that storing the data is completed, sending a storage path corresponding to the second designated local storage space to the Web client.

12. The electronic device of claim 11, wherein after sending the storage path corresponding to the second designated local storage space to the Web client, the operations further comprise:
      receiving an access instruction for the storage path sent by the Web client; and
      accessing the storage path in response to the access instruction.

13. A non-transitory storage medium storing computer instructions for execution by at least one processor to perform operations comprising:
   establishing a data connection between a local service and a Web client, wherein the local service and the Web client are installed in a same electronic device, and the local service is an application which runs independently from the Web client;
   after establishing the data connection between the local service and the Web client, generating a target identifier that is configured to uniquely identify the data connection;
   receiving a data processing instruction including a data storage policy sent from the Web client to the local service through the data connection, wherein the data storage policy specifies one of a temporary storage of data or a long-term storage of data;
   receiving data that the Web client transmits to the local service through the data connection; and
   storing, through the local service, the data in a designated local storage space of the electronic device based on the data storage policy, the designated local storage space corresponding to the target identifier.

14. The non-transitory storage medium of claim 13, wherein the data storage policy specifies the temporary storage of data, and the designated local storage space is a first designated local storage space for the temporary storage, and the operations further comprise: in response to determining that storing the data is completed, sending the data stored in the first designated local storage space to the Web client, and deleting the data stored in the first designated local storage space; or
   wherein the data storage policy specifies the long-term storage of data, and the designated local storage space is a second designated local storage space for the long-term storage, and the operations further comprise: in response to determining that storing the data is completed, sending a storage path corresponding to the second designated local storage space to the Web client.

* * * * *